(12) United States Patent
Matsubara et al.

(10) Patent No.: US 12,134,134 B2
(45) Date of Patent: Nov. 5, 2024

(54) CUTTING INSERT

(71) Applicant: Sumitomo Electric Hardmetal Corp., Itami (JP)

(72) Inventors: Kouki Matsubara, Itami (JP); Tomoyuki Fukuyama, Itami (JP); Shota Takemura, Itami (JP); Shota Tsujimoto, Itami (JP); Naoki Matsuda, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 532 days.

(21) Appl. No.: 17/442,614

(22) PCT Filed: Mar. 24, 2020

(86) PCT No.: PCT/JP2020/013034
§ 371 (c)(1),
(2) Date: Sep. 24, 2021

(87) PCT Pub. No.: WO2020/196526
PCT Pub. Date: Oct. 1, 2020

(65) Prior Publication Data
US 2022/0168820 A1 Jun. 2, 2022

(30) Foreign Application Priority Data
Mar. 27, 2019 (JP) ............................. 2019-060278

(51) Int. Cl.
*B23B 27/16* (2006.01)
(52) U.S. Cl.
CPC .... *B23B 27/1611* (2013.01); *B23C 2200/125* (2013.01)

(58) Field of Classification Search
CPC ......... B23B 27/1611; B23C 2200/0411; B23C 2200/123; B23C 2200/125;
(Continued)

(56) References Cited

U.S. PATENT DOCUMENTS 5,052,863 A * 10/1991 Satran ..................... B23C 5/109
407/116
5,207,538 A * 5/1993 Satran ................... B23C 5/2213
D15/139
(Continued)

FOREIGN PATENT DOCUMENTS

CN 1154670 A 7/1997
EP 1584409 A1 * 10/2005 ............. B23C 5/207
(Continued)

*Primary Examiner* — Sara Addisu
(74) *Attorney, Agent, or Firm* — XSENSUS LLP

(57) ABSTRACT

A cutting insert is mountable on a body. The cutting insert includes: a top surface; a bottom surface opposite to the top surface; a side surface contiguous to the top surface and the bottom surface; and a cutting edge formed at a ridgeline between the top surface and the side surface. The side surface has a first surface disposed adjacent to the cutting edge and a second surface contiguous to the first surface. When viewed in a cross sectional view parallel to the bottom surface, the second surface has a first position and a second position that are brought into abutment with the body when mounted on the body. Between the first position and the second position, an imaginary straight line extending through the first position and the second position is separated from the second surface.

8 Claims, 11 Drawing Sheets

(58) Field of Classification Search
CPC . B23C 2200/287; B23C 5/202; B23C 5/2213; B23C 2200/0416
See application file for complete search history.

(56) References Cited

U.S. PATENT DOCUMENTS

| | | | | |
|---|---|---|---|---|
| 5,365,805 A * | 11/1994 | Pantzar | ............... | B23P 15/28 76/101.1 |
| 5,382,118 A | 1/1995 | Satran et al. | | |
| 5,383,750 A * | 1/1995 | Satran | ............... | B23C 5/2213 407/113 |
| 5,443,334 A * | 8/1995 | Pantzar | ............... | B23C 5/202 407/42 |
| 5,544,984 A * | 8/1996 | Pantzar | ............... | B23C 5/202 407/113 |
| 5,597,271 A * | 1/1997 | Men | ............... | B23C 5/2213 407/113 |
| 5,685,670 A * | 11/1997 | Satran | ............... | B23C 5/2213 407/42 |
| 5,718,540 A * | 2/1998 | Satran | ............... | B23C 5/2213 407/42 |
| 5,803,674 A * | 9/1998 | Satran | ............... | B23B 27/143 407/42 |
| 5,810,521 A * | 9/1998 | Pantzar | ............... | B23B 27/145 407/115 |
| 5,853,267 A * | 12/1998 | Satran | ............... | B23C 5/202 407/116 |
| 5,944,456 A * | 8/1999 | Shirley | ............... | B23C 5/202 407/53 |
| 6,074,137 A | 6/2000 | Betman et al. | | |
| 6,116,824 A * | 9/2000 | Strand | ............... | B23C 5/2213 407/41 |
| 6,142,716 A * | 11/2000 | Jordberg | ............... | B23C 5/202 407/115 |
| 6,196,770 B1 * | 3/2001 | Astrom | ............... | B23C 5/109 407/43 |
| 6,929,427 B2 * | 8/2005 | Satran | ............... | B23C 5/109 407/42 |
| 6,957,935 B2 * | 10/2005 | Sung | ............... | B23C 5/205 407/113 |
| 7,281,884 B2 * | 10/2007 | Maeda | ............... | B23C 5/109 407/42 |
| 9,120,156 B2 * | 9/2015 | Hecht | ............... | B23B 27/1651 |
| 10,150,170 B2 * | 12/2018 | Nam | ............... | B23C 5/202 |
| 10,343,221 B2 * | 7/2019 | Nam | ............... | B23C 5/202 |
| 11,453,074 B2 * | 9/2022 | Andersson | ............... | B23C 5/202 |
| 2002/0098048 A1 * | 7/2002 | Satran | ............... | B23C 5/2213 407/113 |
| 2002/0192041 A1 * | 12/2002 | Wallstrom | ............... | B23C 5/2213 407/43 |
| 2003/0170079 A1 * | 9/2003 | Daiguji | ............... | B23C 5/2213 407/34 |
| 2005/0084342 A1 * | 4/2005 | Festeau | ............... | B23C 5/202 407/113 |
| 2006/0013661 A1 | 1/2006 | Long, II et al. | | |
| 2007/0160431 A1 * | 7/2007 | Pantzar | ............... | B23C 5/2213 407/67 |
| 2007/0248425 A1 * | 10/2007 | Andersson | ............... | B23C 5/2213 407/113 |
| 2008/0152439 A1 * | 6/2008 | Andersson | ............... | B23C 5/2208 407/102 |
| 2010/0034601 A1 * | 2/2010 | Ballas | ............... | B23C 5/202 407/34 |
| 2010/0247252 A1 * | 9/2010 | Hatta | ............... | B23C 5/202 407/100 |
| 2010/0303563 A1 * | 12/2010 | Fang | ............... | B23C 5/202 407/113 |
| 2011/0236143 A1 * | 9/2011 | Ryu | ............... | B23C 5/2213 407/103 |
| 2013/0022417 A1 * | 1/2013 | Gesell | ............... | B23C 5/202 407/113 |
| 2013/0108387 A1 | 5/2013 | Ishi et al. | | |
| 2013/0115022 A1 * | 5/2013 | Ishi | ............... | B23C 5/202 407/100 |
| 2013/0243537 A1 | 9/2013 | Ogata | | |
| 2014/0010607 A1 * | 1/2014 | Wandeback | ............... | B23F 21/146 407/113 |
| 2014/0234037 A1 * | 8/2014 | Horiike | ............... | B23B 27/1611 407/47 |
| 2015/0023743 A1 | 1/2015 | Ramesh | | |
| 2015/0336187 A1 * | 11/2015 | Choi | ............... | B23C 5/06 407/113 |
| 2016/0067805 A1 * | 3/2016 | Nickel | ............... | B23F 21/146 407/28 |
| 2016/0167137 A1 * | 6/2016 | Agic | ............... | B23B 27/1662 407/66 |
| 2017/0197259 A1 * | 7/2017 | Kumoi | ............... | B23C 5/2213 |
| 2018/0001399 A1 * | 1/2018 | Kister | ............... | B23C 5/2226 |
| 2018/0221969 A1 * | 8/2018 | Oprasic | ............... | B23C 5/202 |
| 2020/0254535 A1 * | 8/2020 | Knecht | ............... | B23C 5/202 |
| 2021/0252615 A1 * | 8/2021 | Kister | ............... | B23C 5/06 |
| 2022/0161334 A1 * | 5/2022 | Matsubara | ............... | B23B 27/1607 |
| 2022/0168825 A1 * | 6/2022 | Matsubara | ............... | B23C 5/109 |
| 2022/0203459 A1 * | 6/2022 | Tsujimoto | ............... | B23C 5/202 |
| 2022/0258258 A1 * | 8/2022 | Aso | ............... | B23C 5/2213 |
| 2023/0278115 A1 * | 9/2023 | Kakai | ............... | B23C 5/109 407/113 |
| 2023/0373020 A1 * | 11/2023 | Kantojarvi | ............... | B23C 5/2213 |

FOREIGN PATENT DOCUMENTS

| | | |
|---|---|---|
| EP | 1813368 A2 | 8/2007 |
| EP | 2471618 A1 | 7/2012 |
| JP | 6-190624 A | 7/1994 |
| JP | 2000-506445 A | 5/2000 |
| JP | 2007-268641 A | 10/2007 |
| JP | 2008-62382 A | 3/2008 |
| JP | 2012-81526 A | 4/2012 |
| JP | 2012-86303 A | 5/2012 |
| WO | 97/27019 A1 | 7/1997 |
| WO | 02/102536 A1 | 12/2002 |
| WO | 2012/014977 A1 | 2/2012 |
| WO | 2012/090057 A1 | 7/2012 |

* cited by examiner

CUTTING INSERT

CROSS-REFERENCE TO RELATED APPLICATIONS

The present application is based on PCT filing PCT/JP2020/013034, filed Mar. 24, 2020, which claims priority to JP 2019-060278, filed Mar. 27, 2019, the entire contents of each are incorporated herein by reference.

TECHNICAL FIELD

The present disclosure relates to a cutting insert.

BACKGROUND ART

PTL 1 (Japanese Patent Laying-Open No. 2007-268641) describes a cutting insert. PTL 2 (Japanese Patent Laying-Open No. 2008-62382) describes a cutting insert. Each of the cutting insert described in PTL 1 and the cutting insert described in PTL 2 is mountable on a body by bringing a side surface of the cutting insert into abutment with the body.

CITATION LIST

Patent Literature

PTL 1: Japanese Patent Laying-Open No. 2007-268641
PTL 2: Japanese Patent Laying-Open No. 2008-62382

SUMMARY OF INVENTION

A cutting insert of the present disclosure is mountable on the body and includes: an top surface; a bottom surface opposite to the top surface; a side surface contiguous to the top surface and the bottom surface; and a cutting edge formed at a ridgeline between the top surface and the side surface. The side surface has a first surface disposed adjacent to the cutting edge and a second surface contiguous to the first surface. When viewed in a cross sectional view parallel to the bottom surface, the second surface has a first position and a second position that are brought into abutment with the body when mounted on the body. Between the first position and the second position, an imaginary straight line extending through the first position and the second position is separated from the second surface.

DETAILED DESCRIPTION

Figure 1:
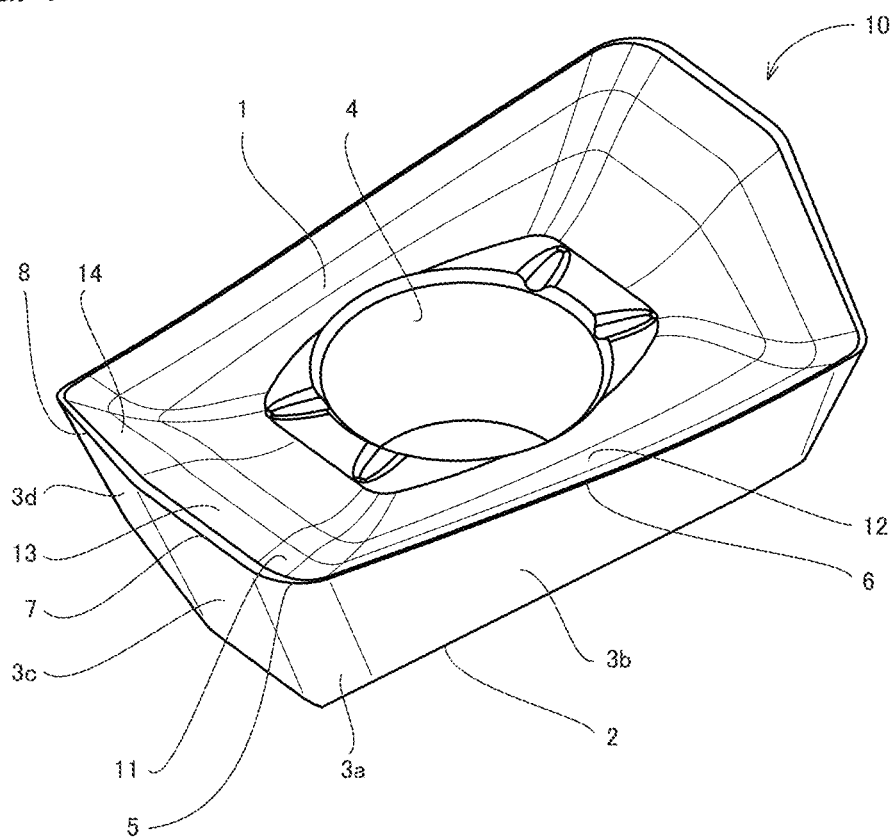
FIG. 1 is a perspective view of a cutting insert 10.

[Problem to be Solved by the Present Disclosure]
Each of the cutting insert described in PTL 1 and the cutting insert described in PTL 2 has room for improvement in precision of mounting on the body.
It is an object of the present disclosure to provide a cutting insert mountable on a body with precision.
[Advantageous Effect of the Present Disclosure]
According to the cutting insert of the present disclosure, the cutting insert is mountable on a body with precision.

DESCRIPTION OF EMBODIMENTS

Hereinafter, embodiments of the present disclosure are listed and described.

(1) A cutting insert according to an embodiment is mountable on a body. The cutting insert includes: a top surface; a bottom surface opposite to the top surface; a side surface contiguous to the top surface and the bottom surface; and a cutting edge formed at a ridgeline between the top surface and the side surface. The side surface has a first surface disposed adjacent to the cutting edge and a second surface contiguous to the first surface. When viewed in a cross sectional view parallel to the bottom surface, the second surface has a first position and a second position that are brought into abutment with the body when mounted on the body. Between the first position and the second position, an imaginary straight line extending through the first position and the second position is separated from the second surface.

According to the cutting insert according to (1), the cutting insert can be mounted on the body with precision.

(2) In the cutting insert according to (1), when viewed in the cross sectional view parallel to the bottom surface, the second surface between the first position and the second position may form a curve that is recessed toward an inner side of the cutting insert.

(3) In the cutting insert according to (2), when viewed in the cross sectional view parallel to the bottom surface, a depression amount may be less than or equal to 0.1 mm, the depression amount being defined to represent a maximum value of a distance between the imaginary straight line and the curve.

(4) In the cutting insert according to (3), when a first cross section is defined as a cross section that intersects the second surface and that is parallel to the bottom surface and a second cross section is defined as a cross section that is located close to the bottom surface with respect to the first cross section, that intersects the second surface, and that is parallel to the bottom surface, the depression amount in the second cross section may be larger than the depression amount in the first cross section.

(5) In the cutting insert according to (4), when viewed in a top view, a boundary between the first surface and the second surface may form a straight line.

(6) The cutting insert according to any one of (1) to (5) may further include a corner cutting edge contiguous to the cutting edge. The cutting edge may have a front end located on the corner cutting edge side and a rear end located opposite to the front end. A width of the first surface on the rear end side may be larger than the width of the first surface on the front end side. The width of the first surface may be decreased in a direction from the front end side toward an intermediate position located between the front end and the rear end, may have a minimum value at the intermediate position, and may be increased in a direction from the intermediate position toward the rear end side. In this case, cutting edge strength on the front end side can be secured, and an increase in cutting resistance when an amount of cut is increased can be suppressed. Further, in this case, interference with a workpiece can be prevented.

(7) In the cutting insert according to (6), when viewed in a side view, a distance between the cutting edge and the bottom surface may be decreased in the direction from the front end side toward the intermediate position. When viewed in the side view, a distance between the bottom surface and a boundary between the first surface and the second surface may be increased in the direction from the front end side toward the intermediate position.

(8) In the cutting insert according to (6) or (7), the minimum value of the width of the first surface may be less than or equal to 1 mm.

DETAILS OF EMBODIMENTS OF THE PRESENT DISCLOSURE

Next, details of the embodiments of the present disclosure will be described with reference to figures. In the figures described below, the same or corresponding portions are denoted by the same reference characters, and the same matters will not be described repeatedly.

First Embodiment

Hereinafter, a configuration of a cutting insert (hereinafter, referred to as "cutting insert 10") according to a first embodiment will be described.

Cutting insert 10 is composed of, for example, a cemented carbide. FIG. 1 is a perspective view of cutting insert 10. As shown in FIG. 1, cutting insert 10 has a top surface 1, a bottom surface 2, a first side surface 3a, a second side surface 3b, a third side surface 3c, and a fourth side surface 3d. Bottom surface 2 is opposite to top surface 1.

First side surface 3a to fourth side surface 3d are contiguous to top surface 1 and bottom surface 2. First side surface 3a is located between second side surface 3b and third side surface 3c, and is contiguous to second side surface 3b and third side surface 3c. Third side surface 3c is located between first side surface 3a and fourth side surface 3d, and is contiguous to first side surface 3a and fourth side surface 3d. A mounting hole 4 is formed in cutting insert 10. Mounting hole 4 extends through cutting insert 10 along a direction from top surface 1 toward bottom surface 2.

Cutting insert 10 has a first cutting edge 5 (corner cutting edge), a second cutting edge 6 (main cutting edge), a third cutting edge 7 (flat cutting edge), and a fourth cutting edge 8 (sub cutting edge). When viewed in a top view, cutting insert 10 has a shape that is point-symmetrical with respect to the center of mounting hole 4.

Figure 2:
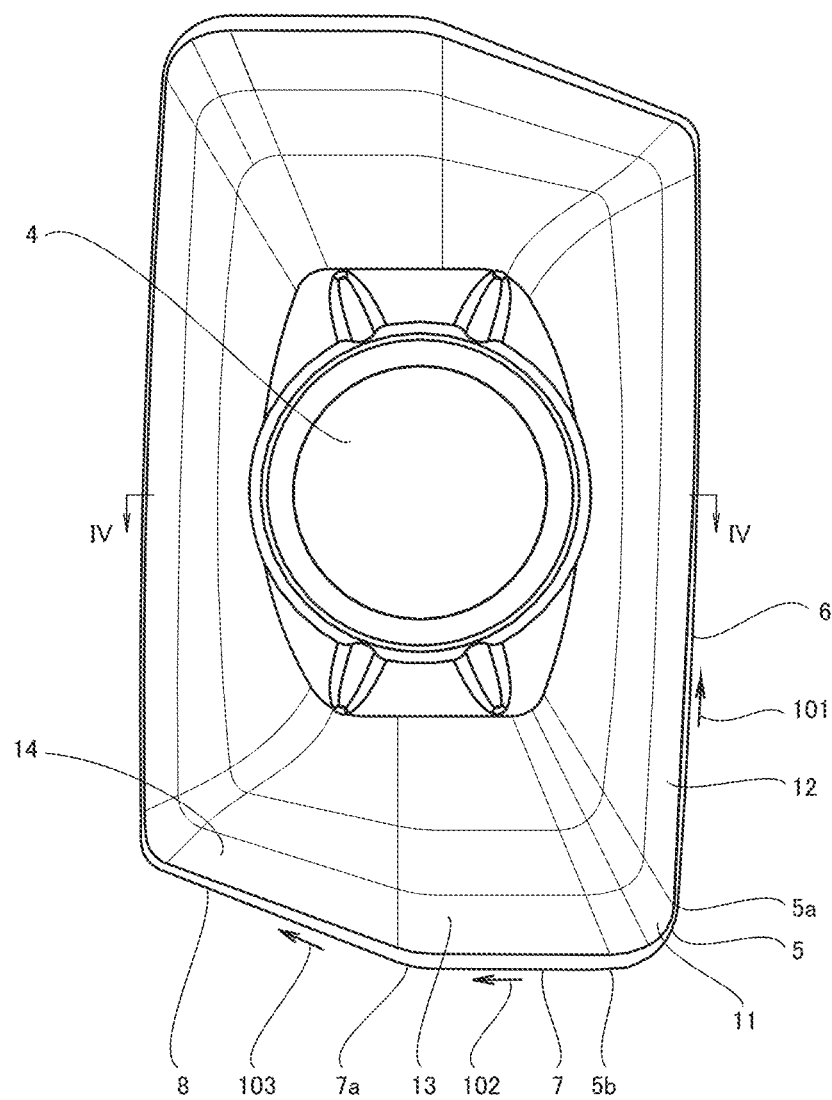
FIG. 2 is a top view of cutting insert 10.

FIG. 2 is a top view of cutting insert 10. As shown in FIG. 2, first cutting edge 5 has a curved shape that protrudes toward an outer side of cutting insert 10. That is, an imaginary straight line that connects one end 5a of first cutting edge 5 to other end 5b of first cutting edge 5 extends over cutting insert 10.

When viewed in the top view, second cutting edge 6 extends from one end 5a of first cutting edge 5 along a first direction 101. When viewed in the top view, third cutting edge 7 extends from other end 5b of first cutting edge 5 along a second direction 102. Second direction 102 intersects first direction 101. When viewed in the top view, fourth cutting edge 8 extends, along third direction 103, from end 7a of third cutting edge 7 opposite to first cutting edge 5. Third direction 103 forms an acute angle with respect to second direction 102.

Top surface 1 has a first rake face 11, a second rake face 12, a third rake face 13, and a fourth rake face 14. First cutting edge 5 is formed at a ridgeline between first side surface 3a and first rake face 11. Second cutting edge 6 is formed at a ridgeline between second side surface 3b and second rake face 12. Third cutting edge 7 is formed at a ridgeline between third side surface 3c and third rake face 13. Fourth cutting edge 8 is formed at a ridgeline between fourth side surface 3d and fourth rake face 14.

First rake face 11 is located between second rake face 12 and third rake face 13, and is contiguous to second rake face 12 and third rake face 13. Third rake face 13 is located between first rake face 11 and fourth rake face 14 and is contiguous to first rake face 11 and fourth rake face 14.

Figure 3:
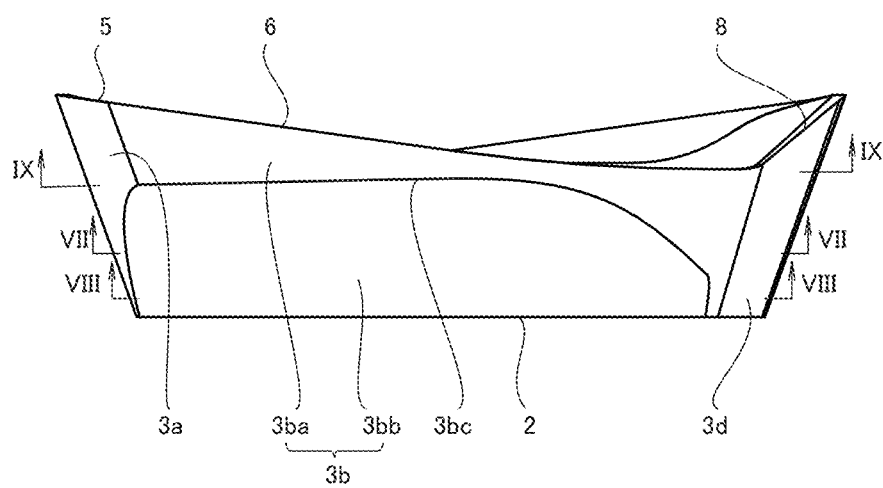
FIG. 3 is a side view of cutting insert 10 when viewed from the second side surface 3b side.

FIG. 3 is a side view of cutting insert 10 when viewed from the second side surface 3b side. As shown in FIG. 3, second side surface 3b includes a first surface 3ba and a second surface 3bb. First surface 3ba is adjacent to second cutting edge 6. From another viewpoint, it can be said that second cutting edge 6 is formed at a ridgeline between first surface 3ba and second rake face 12. First surface 3ba forms a flank face for second cutting edge 6. Second surface 3bb is contiguous to first surface 3ba on the side opposite to second cutting edge 6. A boundary line between first surface 3ba and second surface 3bb is defined as a boundary line 3bc.

Figure 4:
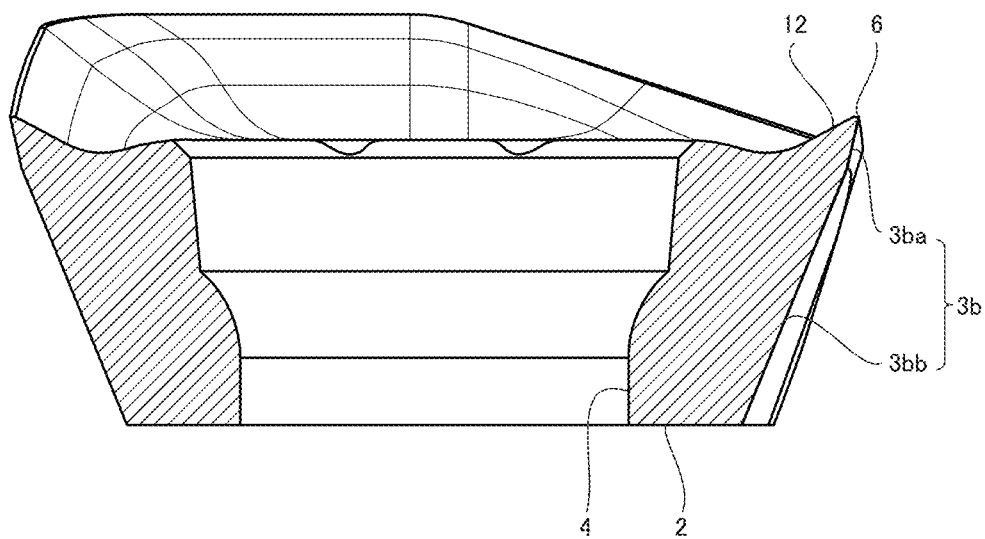
FIG. 4 is a cross sectional view taken along IV-IV in FIG. 2.

FIG. 4 is a cross sectional view taken along IV-IV in FIG. 2. FIG. 4 shows a cross sectional view that intersects second cutting edge 6. As shown in FIG. 4, the inclination of second surface 3bb with respect to an imaginary straight line extending through second cutting edge 6 and orthogonal to bottom surface 2 is larger than the inclination of first surface 3ba with respect to this straight line.

Figure 5:
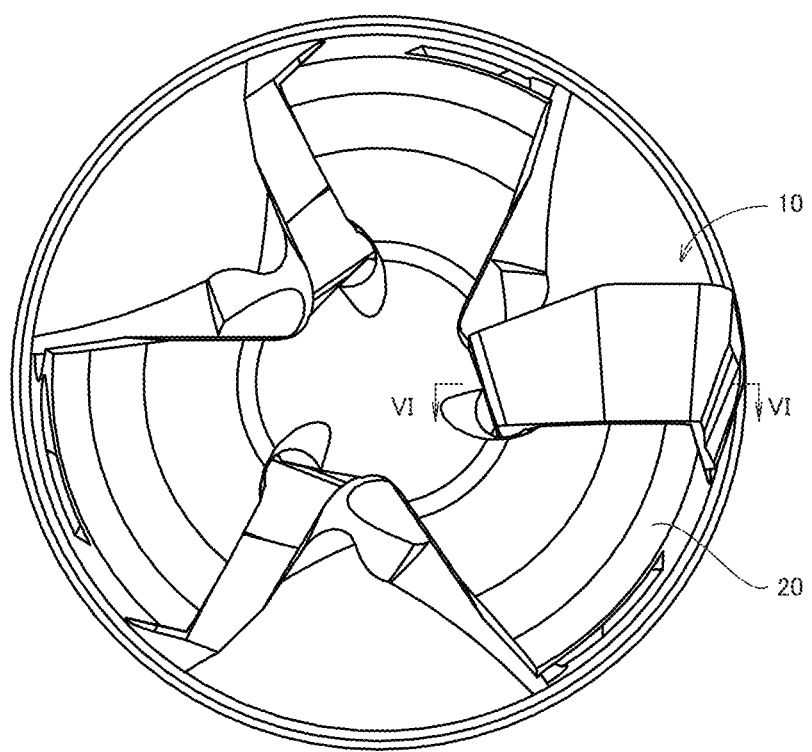
FIG. 5 is a front view of cutting insert 10 mounted on body 20.
Figure 6:
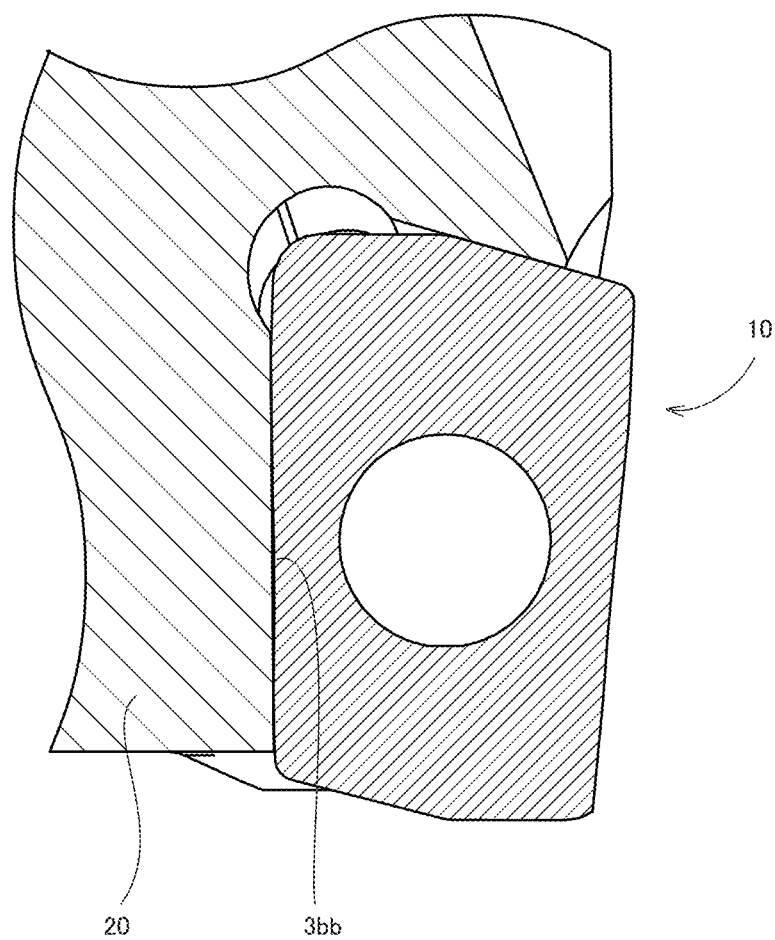
FIG. 6 is a cross sectional view taken along VI-VI in FIG. 5.

FIG. 5 is a front view of cutting insert 10 mounted on a body 20. FIG. 6 is a cross sectional view taken along VI-VI in FIG. 5. As shown in FIGS. 5 and 6, cutting insert 10 can be mounted on body 20 by bringing second surface 3bb into abutment with body 20. It should be noted that in the state in which cutting insert 10 is mounted on body 20, first surface 3ba is not in abutment with body 20.

Figure 7:
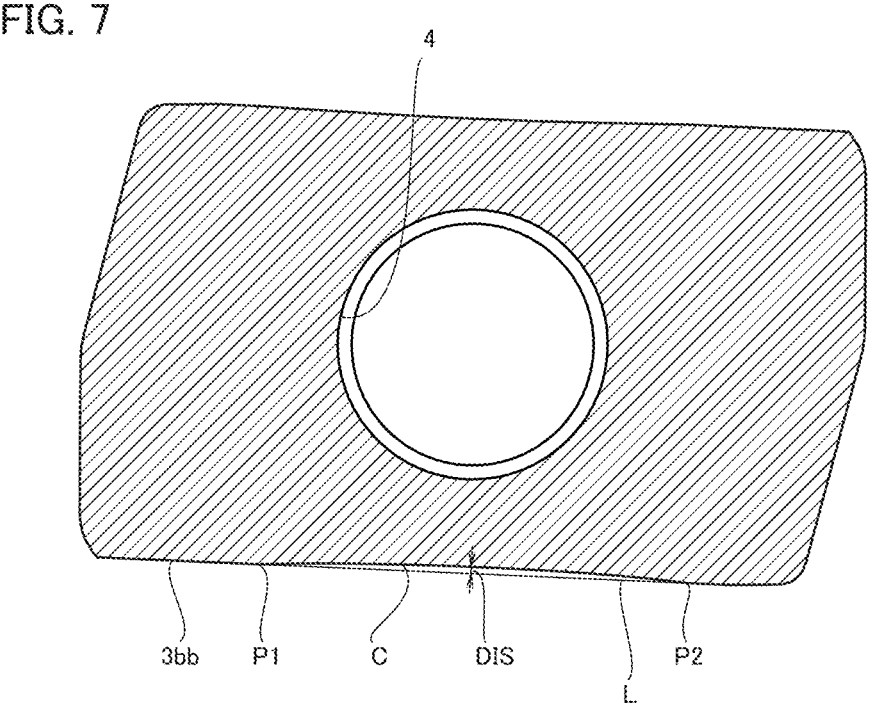
FIG. 7 is a cross sectional view taken along VII-VII in FIG. 3.

FIG. 7 is a cross sectional view taken along VII-VII in FIG. 3. FIG. 7 shows a cross sectional view parallel to bottom surface 2. When mounted on body 20, second surface 3bb is in abutment with body 20 at first position P1 and second position P2. When mounted on body 20, second surface 3bb between first position P1 and second position P2 is not in abutment with body 20. More specifically, as shown in FIG. 7, second surface 3bb between first position P1 and second position P2 forms a curve C that is recessed toward an inner side of cutting insert 10. The direction toward the inner side of cutting insert 10 is a direction from second surface 3bb toward mounting hole 4. That is, second surface 3bb between first position P1 and second position P2 is depressed. From another viewpoint, it can be said that between first position P1 and second position P2, an imaginary straight line (straight line L) that connects first position P1 to second position P2 is separated from second surface 3bb.

A depression amount DIS is defined to represent the maximum value of a distance between straight line L and curve C. Depression amount DIS is preferably less than or equal to 0.1 mm. Depression amount DIS is more preferably more than or equal to 0.005 mm and less than or equal to 0.05 mm.

Figure 8:
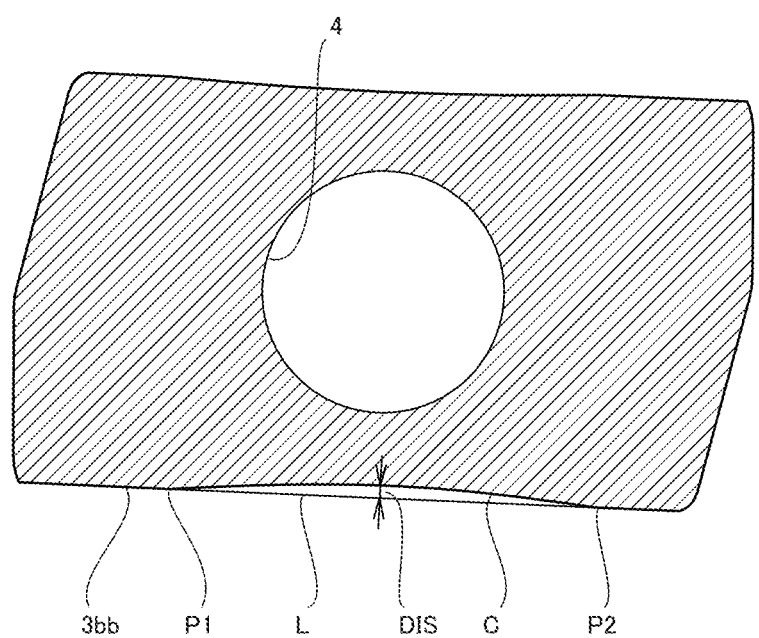
FIG. 8 is a cross sectional view taken along VIII-VIII in FIG. 3.

FIG. 8 is a cross sectional view taken along VIII-VIII in FIG. 3. FIG. 8 shows a cross sectional view parallel to bottom surface 2 at a position close to bottom surface 2 with respect to the position in FIG. 7. As shown in FIGS. 7 and 8, depression amount DIS is larger as the position is closer to bottom surface 2. From another viewpoint, it can be said that when a first cross section (for example, shown in FIG. 7) is defined as a cross section that intersects second surface 3bb and that is parallel to bottom surface 2 and a second cross section (for example, shown in FIG. 8) is defined as a cross section that is located close to bottom surface 2 with respect to the first cross section, that intersects second surface 3bb, and that is parallel to bottom surface 2, depression amount DIS in the second cross section is larger than depression amount DIS in the first cross section.

Figure 9:
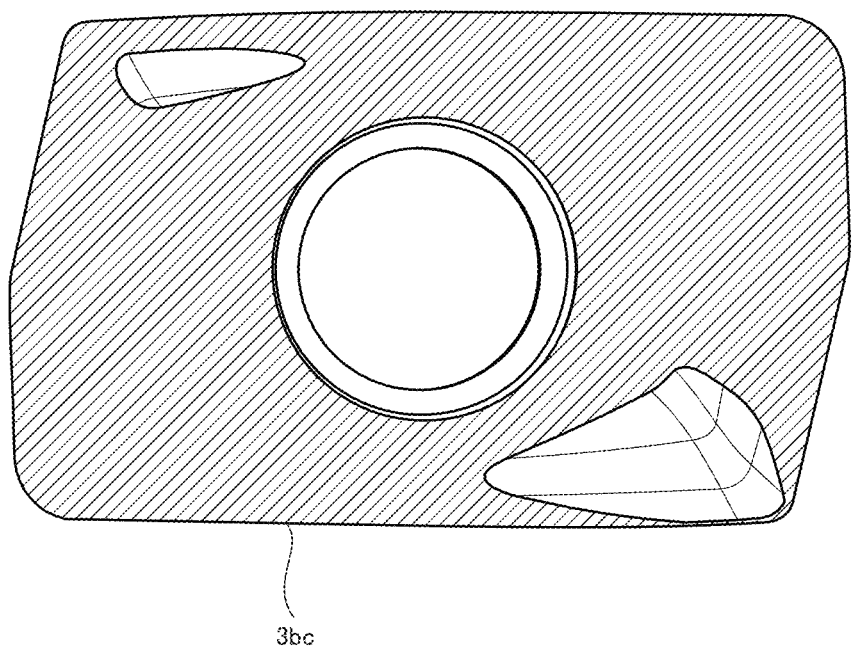
FIG. 9 is a cross sectional view taken along IX-IX in FIG. 3.

FIG. 9 is a cross sectional view taken along IX-IX in FIG. 3. FIG. 9 shows a cross sectional view showing a cross section including boundary line 3bc when viewed in the direction orthogonal to bottom surface 2. As shown in FIG. 9, boundary line 3bc forms a straight line when viewed in the top view.

The following describes effects of cutting insert 10 in comparison with a cutting insert (hereinafter, referred to as "cutting insert 40") according to a comparative example.

Figure 10:
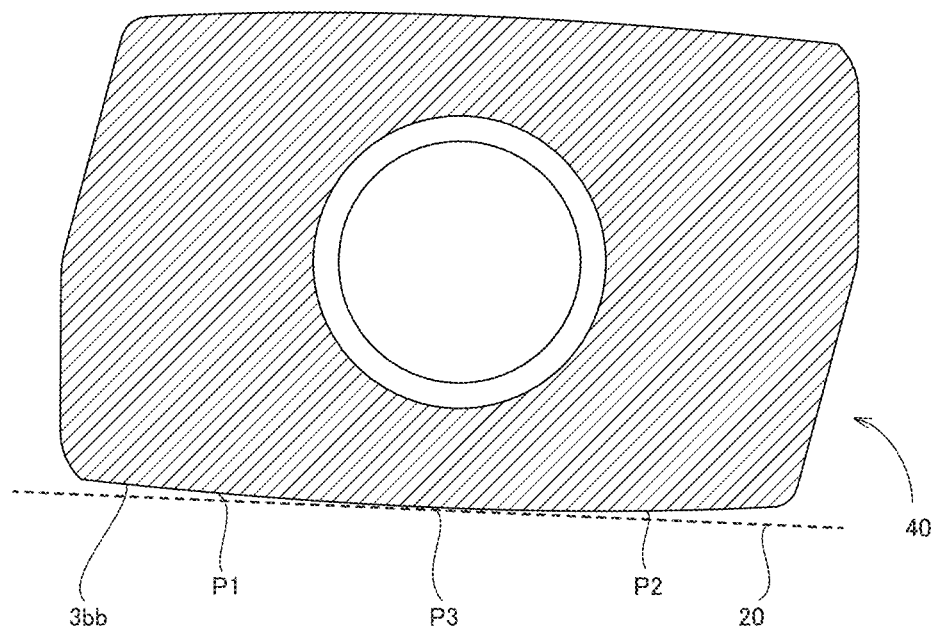
FIG. 10 is a cross sectional view parallel to a bottom surface 2 of a cutting insert 40.

FIG. 10 is a cross sectional view parallel to a bottom surface 2 of cutting insert 40. In FIG. 10, body 20 is indicated by a dotted line. As shown in FIG. 10, cutting insert 40 is similar to cutting insert 10 in that second side surface 3b has a second surface 3bb.

However, when cutting insert 40 is mounted on body 20, second surface 3bb is not in abutment with body 20 at first position P1 and second position P2, but is in abutment with body 20 at a third position P3 located between first position P1 and second position P2. That is, when viewed in the cross sectional view parallel to bottom surface 2, second surface 3bb between first position P1 and second position P2 forms a curve that protrudes toward an outer side of cutting insert 40.

As a result, second surface 3bb and body 20 are in contact with each other at one point, with the result that cutting insert 40 may become unstable with respect to body 20 when cutting insert 40 is mounted on body 20. In other words, there is room for improvement in precision of mounting cutting insert 40 on body 20.

On the other hand, in cutting insert 10, second surface 3bb is in abutment with body 20 at first position P1 and second position P2 and is separated from body 20 between first position P1 and second position P2, with the result that second surface 3bb and body 20 are in contact with each other at two points. As a result, cutting insert 10 is less likely to be unstable with respect to body 20 when cutting insert 10 is mounted on body 20, thereby improving the precision of mounting on body 20.

Second Embodiment

Hereinafter, a configuration of a cutting insert (hereinafter, referred to as "cutting insert 30") according to the second embodiment will be described. Here, the following mainly describes differences from the configuration of cutting insert 10, and the same matters will not be described repeatedly.

Figure 11:
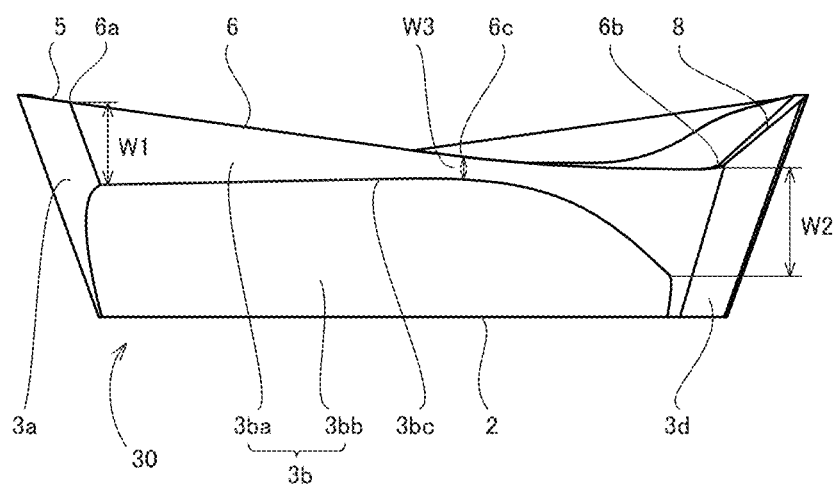
FIG. 11 is a side view of a cutting insert 30 when viewed from the second side surface 3b side.

FIG. 11 is a side view of cutting insert 30 when viewed from the second side surface 3b side. As shown in FIG. 11, a second cutting edge 6 has a front end 6a and a rear end 6b.

Second cutting edge 6 is contiguous to a first cutting edge 5 at front end 6a. Rear end 6b is an end opposite to front end 6a.

The width of first surface 3ba on the front end 6a side is defined as a width W1. The width of first surface 3ba on the rear end 6b side is defined as a width W2. Width W2 is larger than width W1. The width of first surface 3ba has a minimum value at an intermediate position 6c between front end 6a and rear end 6b. The minimum value of the width of first surface 3ba is defined as a width W3. That is, the width of first surface 3ba is decreased in a direction from the front end 6a side toward intermediate position 6c, and has the minimum value at intermediate position 6c. Further, the width of first surface 3ba is increased in a direction from intermediate position 6c toward rear end 6b.

Width W1, width W2 and width W3 are measured along a direction orthogonal to bottom surface 2. Width W3 is preferably less than or equal to 1 mm. Width W3 is more preferably less than or equal to 0.6 mm.

Second cutting edge 6 is inclined such that a distance from bottom surface 2 becomes smaller in the direction from the front end 6a side toward intermediate position 6c. That is, the distance between second cutting edge 6 and bottom surface 2 is decreased in the direction from the front end 6a side toward intermediate position 6c. The distance between second cutting edge 6 and bottom surface 2 is measured along the direction orthogonal to bottom surface 2.

Boundary line 3bc is inclined such that a distance from bottom surface 2 becomes larger in the direction from the front end 6a side toward intermediate position 6c. That is, the distance between boundary line 3bc and bottom surface 2 is increased in the direction from the front end 6a side toward intermediate position 6c. The distance between boundary line 3bc and bottom surface 2 is measured along the direction orthogonal to bottom surface 2.

From another point of view, it can be said that between front end 6a and intermediate position 6c, the inclination of second cutting edge 6 and the inclination of boundary line 3bc are opposite to each other.

Effects of cutting insert 30 will be described below. Here, the following mainly describes differences from the effects of cutting insert 10, and the same matters will not be described repeatedly.

First surface 3ba forms a flank face for second cutting edge 6. Therefore, as the width of first surface 3ba is wider, the cutting edge strength of second cutting edge 6 is more secured. Cutting force exerted on second cutting edge 6 is large on the front end 6a side; however, in cutting insert 30, the width of first surface 3ba is increased in the direction from intermediate position 6c toward the front end 6a side, with the result that the cutting edge strength can be secured at a position on second cutting edge 6 to which relatively large cutting force is exerted.

On the other hand, as the width of first surface 3ba is larger, cutting resistance becomes larger due to contact between the flank face and a workpiece. In cutting insert 30, since the width of first surface 3ba is decreased in the direction from the front end 6a side toward intermediate position 6c, the cutting resistance can be reduced while securing the cutting edge strength on the front end 6a side when the amount of cut of cutting insert 30 is increased. Further, in cutting insert 30, since the width of first surface 3ba is increased in the direction from intermediate position 6c toward the rear end 6b side and width W2 is larger than width W1 (that is, the width of first surface 3ba is maximum at rear end 6b), interference with the workpiece can be prevented.

Since the inclination of second surface 3bb with respect to the straight line extending through second cutting edge 6 and orthogonal to bottom surface 2 is larger than the inclination of first surface 3ba with respect to the straight line extending through second cutting edge 6 and orthogonal to bottom surface 2, flank wear is less likely to be progressed beyond boundary line 3bc. Therefore, according to cutting insert 30, the flank wear can be suppressed by the width of first surface 3ba being decreased in the direction from the front end 6a side toward intermediate position 6c.

In cutting insert 30, the distance between second cutting edge 6 and bottom surface 2 is decreased in the direction from the front end 6a side toward intermediate position 6c and the distance between boundary line 3bc and bottom surface 2 is increased in the direction from the front end 6a side toward intermediate position 6c, so that the width of second surface 3bb can be secured without increasing the thickness of cutting insert 30.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: top surface; 2: bottom surface; 3a: first side surface; 3b: second side surface; 3ba: first surface; 3bb: second surface; 3bc: boundary line; 3c: third side surface; 3d: fourth side surface; 4: mounting hole; 5: first cutting edge; 5a: one end; 5b: other end; 6: second cutting edge; 6a: front end; 6b: rear end; 6c: intermediate position; 7: third cutting edge; 7a: end; 8: fourth cutting edge; 10, 30, 40: cutting insert; 11: first rake face; 12: second rake face; 13: third rake face; 14: fourth rake face; 20: body; 101: first direction; 102: second direction; 103: third direction; C: curve; DIS: depression amount; L: straight line; P1: first position; P2: second position; P3: third position; W1, W2, W3: width.

The invention claimed is:

1. A cutting insert mountable on a body, the cutting insert comprising:
a top surface;
a bottom surface opposite to the top surface;
a side surface contiguous to the top surface and the bottom surface; and
a cutting edge formed at a ridgeline between the top surface and the side surface, wherein
the side surface has a first surface disposed adjacent to the cutting edge and a second surface contiguous to the first surface,
when viewed in a cross sectional view parallel to the bottom surface, the second surface has a first position and a second position that are brought into abutment with the body when mounted on the body,
between the first position and the second position, an imaginary straight line extending through the first position and the second position is separated from the second surface, and
when viewed from a side of the top surface in a cross sectional view which is parallel to the bottom surface and includes a boundary between the first surface and the second surface, the boundary between the first surface and the second surface forms a straight line.

2. The cutting insert according to claim 1, wherein when viewed in the cross sectional view parallel to the bottom surface, the second surface between the first position and the second position forms a curve that is recessed toward an inner side of the cutting insert.

3. The cutting insert according to claim 2, wherein when viewed in the cross sectional view parallel to the bottom surface, a depression amount is less than or equal to 0.1 mm, the depression amount being defined to represent a maximum value of a distance between the imaginary straight line and the curve.

4. The cutting insert according to claim 3, wherein when a first cross section is defined as a cross section that intersects the second surface and that is parallel to the bottom surface and a second cross section is defined as a cross section that is located close to the bottom surface with respect to the first cross section, that intersects the second surface, and that is parallel to the bottom surface, the depression amount in the second cross section is larger than the depression amount in the first cross section.

5. A cutting insert mountable on a body, the cutting insert comprising:
a top surface;
a bottom surface opposite to the top surface;
a side surface contiguous to the top surface and the bottom surface; and
a cutting edge formed at a ridgeline between the top surface and the side surface, wherein
the side surface has a first surface disposed adjacent to the cutting edge and a second surface contiguous to the first surface,
when viewed in a cross sectional view parallel to the bottom surface, the second surface has a first position and a second position that are brought into abutment with the body when mounted on the body, and
between the first position and the second position, an imaginary straight line extending through the first position and the second position is separated from the second surface,
wherein the cutting insert further comprises a corner cutting edge contiguous to the cutting edge,
the cutting edge has a front end located on the corner cutting edge side and a rear end located opposite to the front end,
a width of the first surface on the rear end side is larger than the width of the first surface on the front end side, and
the width of the first surface is decreased in a direction from the front end side toward an intermediate position located between the front end and the rear end, has a minimum value at the intermediate position, and is increased in a direction from the intermediate position toward the rear end side.

6. The cutting insert according to claim 5, wherein
when viewed in a side view, a distance between the cutting edge and the bottom surface is decreased in the direction from the front end side toward the intermediate position, and
when viewed in the side view, a distance between the bottom surface and a boundary between the first surface and the second surface is increased in the direction from the front end side toward the intermediate position.

7. The cutting insert according to claim 5, wherein the minimum value is less than or equal to 1 mm.

8. A cutting insert mountable on a body, the cutting insert comprising:
a top surface;
a bottom surface opposite to the top surface;

a side surface contiguous to the top surface and the bottom surface; and a cutting edge formed at a ridgeline between the top surface and the side surface, wherein the side surface has a first surface disposed adjacent to the cutting edge and a second surface contiguous to the first surface, when viewed in a cross sectional view parallel to the bottom surface, the second surface has a first position and a second position that are brought into abutment with the body when mounted on the body, and between the first position and the second position, an imaginary straight line extending through the first position and the second position is separated from the second surface, wherein when viewed in the cross sectional view parallel to the bottom surface, the second surface between the first position and the second position forms a curve that is recessed toward an inner side of the cutting insert, when viewed in the cross sectional view parallel to the bottom surface, a depression amount is less than or equal to 0.1 mm, the depression amount being defined to represent a maximum value of a distance between the imaginary straight line and the curve, when a first cross section is defined as a cross section that intersects the second surface and that is parallel to the bottom surface and a second cross section is defined as a cross section that is located close to the bottom surface with respect to the first cross section, that intersects the second surface, and that is parallel to the bottom surface, the depression amount in the second cross section is larger than the depression amount in the first cross section, when viewed in a top view, a boundary between the first surface and the second surface forms a straight line, the cutting insert further comprises a corner cutting edge contiguous to the cutting edge, the cutting edge has a front end located on the corner cutting edge side and a rear end located opposite to the front end, a width of the first surface on the rear end side is larger than the width of the first surface on the front end side, the width of the first surface is decreased in a direction from the front end side toward an intermediate position located between the front end and the rear end, has a minimum value at the intermediate position, and is increased in a direction from the intermediate position toward the rear end side, when viewed in a side view, a distance between the cutting edge and the bottom surface is decreased in the direction from the front end side toward the intermediate position, when viewed in the side view, a distance between the bottom surface and a boundary between the first surface and the second surface is increased in the direction from the front end side toward the intermediate position, and the minimum value is less than or equal to 1 mm.

* * * * *